(12) United States Patent
Honda et al.

(10) Patent No.: US 11,759,959 B2
(45) Date of Patent: Sep. 19, 2023

(54) OBJECT CONTROL SYSTEM AND OBJECT CONTROL METHOD

(71) Applicant: SONY INTERACTIVE ENTERTAINMENT INC., Tokyo (JP)

(72) Inventors: Shinichi Honda, Saitama (JP); Akio Ohba, Kanagawa (JP); Hiroyuki Segawa, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 1007 days.

(21) Appl. No.: 16/605,835

(22) PCT Filed: Apr. 25, 2018

(86) PCT No.: PCT/JP2018/016759
§ 371 (c)(1),
(2) Date: Oct. 17, 2019

(87) PCT Pub. No.: WO2018/203501
PCT Pub. Date: Nov. 8, 2018

(65) Prior Publication Data
US 2020/0114520 A1   Apr. 16, 2020

(30) Foreign Application Priority Data
May 2, 2017   (JP) ................. 2017-091909

(51) Int. Cl.
*B25J 11/00* (2006.01)
*G10L 25/63* (2013.01)

(52) U.S. Cl.
CPC .......... *B25J 11/001* (2013.01); *B25J 11/0015* (2013.01); *G10L 25/63* (2013.01)

(58) Field of Classification Search
CPC ..... B25J 11/001; B25J 11/0015; B25J 11/003; G10L 25/63; G06N 3/00
See application file for complete search history.

(56) References Cited

U.S. PATENT DOCUMENTS

2019/0283257 A1* 9/2019 Iyengar .................. G06F 3/167

FOREIGN PATENT DOCUMENTS

| JP | 2002-160184 A | 6/2002 |
| JP | 2002-258886 A | 9/2002 |
| JP | 2003-117866 A | 4/2003 |
| JP | 2005-313308 A | 11/2005 |

(Continued)

OTHER PUBLICATIONS

International Preliminary Report on Patentability dated Nov. 14, 2019, from International Application No. PCT/JP2018/016759, 16 sheets.

(Continued)

*Primary Examiner* — Basil T. Jos
(74) *Attorney, Agent, or Firm* — Katten Muchin Rosenman LLP (57) ABSTRACT

A feeling deduction unit 100 deduces a user's feeling. An internal state management unit 110 manages an internal state of an object and an internal state of a user on the basis of the deduced user's feeling. An action management unit 120 determines an action of the object on the basis of the internal state of the object. An output processing unit 140 causes the object to perform the action determined by the action management unit 120.

7 Claims, 5 Drawing Sheets

(56) References Cited

FOREIGN PATENT DOCUMENTS

| | | |
|---|---|---|
| JP | 2006-123136 A | 5/2006 |
| JP | 2012-059107 A | 3/2012 |
| JP | 2016-036883 A | 3/2016 |
| JP | 2017-077595 A | 4/2017 |

OTHER PUBLICATIONS

International Search Report and Written Opinion dated Jul. 31, 2018, from International Application No. PCT/JP2018/016759, 9 sheets.
Notice of Reasons for Refusal dated Jun. 2, 2020, in Japanese Patent Application No. 2017-091909, 5 sheets.

* cited by examiner

OBJECT CONTROL SYSTEM AND OBJECT CONTROL METHOD

TECHNICAL FIELD

The present invention relates to technology for controlling an action of an object that is an actual object or a virtual object.

BACKGROUND ART

In order to construct a good relationship with other people, it is said that a "joint viewing experience" in which people see the same thing is effective instead of a "face-to-face relationship." It is known that by seeing the same thing at the same place and empathizing with each other, the distance to the other people is shortened and affinity with the other people is increased.

SUMMARY

Technical Problems

The inventor has focused on possibility of utilizing a robot as a joint viewing player who experiences sympathy with a user. For example, it is expected that the user's affinity with the robot is increased and motivation for playing a game is enhanced by the robot viewing the game play next to the user and being pleased or sad together with the user. Further, regarding not only the game but also a movie, a television program, or the like, it is expected that the user may enjoy content mere by viewing the content with the robot as compared to the case of viewing it alone.

The present invention has been made in view of these problems, and an object of the present invention to provide a technology that allows the user to obtain a joint viewing experience with the object such as a robot.

Solution to Problems

In order to solve the above problems, an aspect of the present invention is an object control system for controlling an object, the object control system including: a feeling deduction unit configured to deduce a user's feeling; a user internal state storage unit configured to store an internal state of the user including the user's feeling; an object internal state storage unit configured to store an internal state of the object including an object's feeling; an internal state management unit configured to manage the internal state of the object and the internal state of the user on the basis of the deduced user's feeling; an action management unit configured to determine an action of the object on the basis of the internal state of the object; and an output processing unit configured to cause the object to perform the action determined by the action management unit.

Another aspect of the present invention is an object control method. The method includes; a step of deducing a user's feeling; a step of managing an internal state of the user including the user's feeling; a step of managing an internal state of an object including an object's feeling; a step of updating the internal state of the object and the internal state of the user on the basis of the deduced user's feeling; a step of determining an action of the object on the basis of the internal state of the object; and a step of causing the object to perform the determined action.

In addition, it is also effective as an aspect of the present invention to convert any combination of the above-described components and a representation of the present invention into any of a method, an apparatus, a system, a computer program, a recording medium in which the computer program is readably recorded, a data structure, etc.

DESCRIPTION OF EMBODIMENTS

An object control system of an embodiment provides a mechanism for achieving a joint viewing experience with an actual object or a virtual object. The actual object may be a human-type pet-type robot, and is preferable to be able to output at least audio and to move an arm, a leg, a neck, etc., by having ca motor at a joint portion. A user places a robot nearby and views contents together, while the robot communicates with the user by outputting a reaction to empathize with the user or outputting a reaction against the user conversely, on the basis of a deduced user's feeling.

The virtual object, may be a character such as a person or a pet including a three-dimensional (3D) model, and exists in a virtual space generated by a computer. In the embodiment, in the virtual space constructed when the user wears an HMD, a mechanism is proposed in which the content is reproduced in front of the user, and when the user turns sideways, the user may see how the virtual character is viewing the content together with the user. Similarly to the robot, the virtual character also communicates with the user by outputting the reaction to empathize with the user or outputting the reaction against the user conversely.

Figure 1:
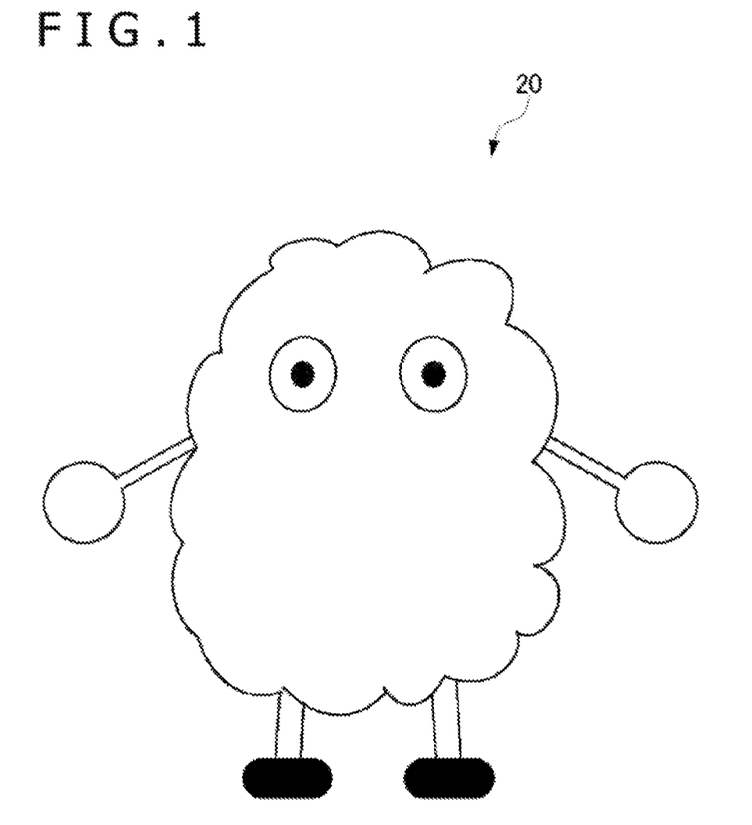
FIG. 1 illustrates a diagram of an example of appearance at an actual object.

FIG. 1 illustrates a diagram of an example of appearance of the actual object. This object is a human-type robot 20, and includes a speaker for outputting audio, a microphone for inputting audio of the outside world, and a drive mechanism that includes a motor for moving each joint or a link for connecting the motors, etc. The robot 20 preferably has an interactive function to talk with the user, and more preferably has an autonomous movement function.

Figure 2:
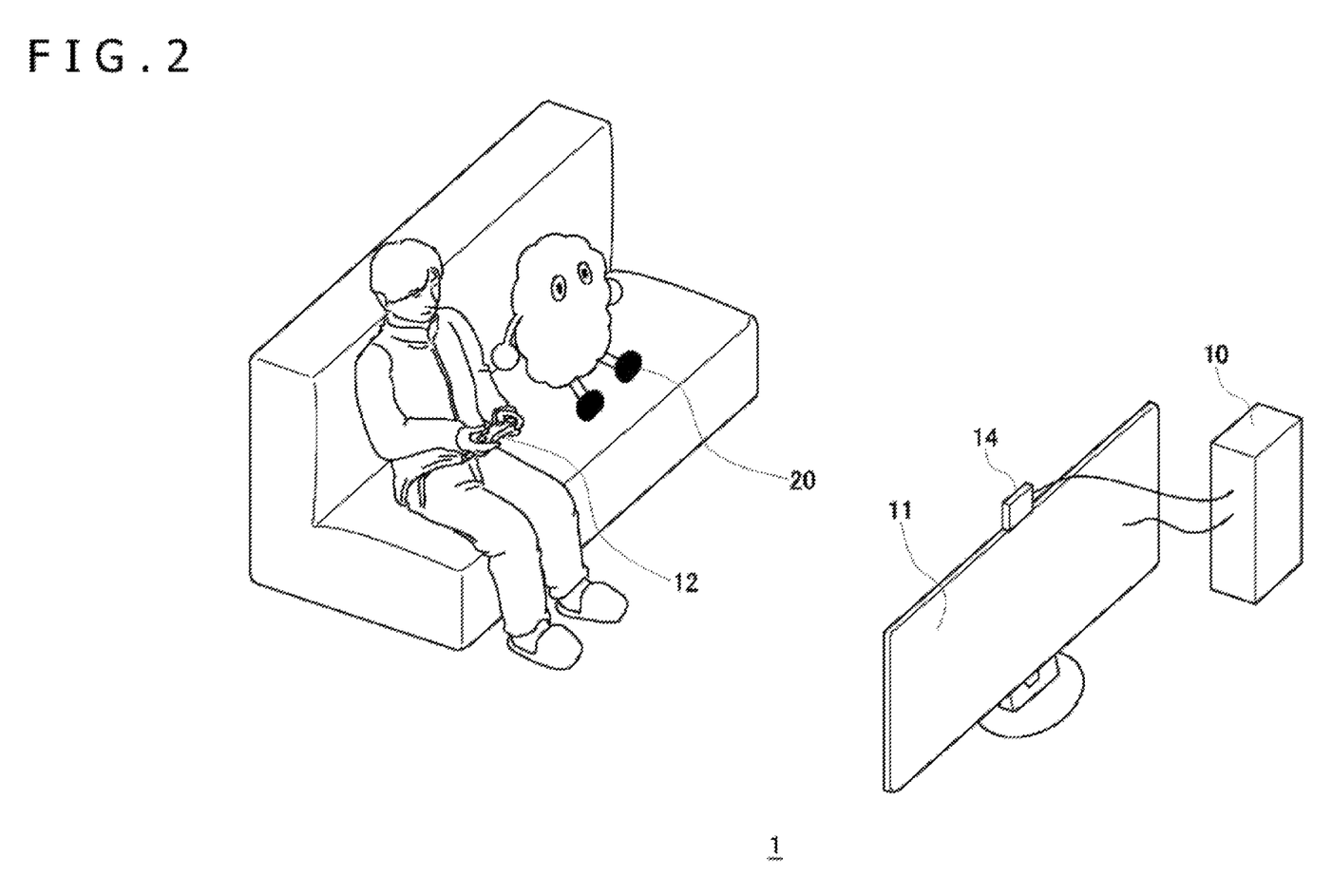
FIG. 2 illustrates a diagram for explaining an outline of an object control system.

FIG. 2 illustrates a diagram for explaining an outline of the object control system 1. FIG. 2 illustrates a situation in which the user sits on a sofa playing the game and the robot 20 sits on the same sofa viewing the user playing the game. Ideally, the robot 20 has such an advanced autonomous movement function as to be seated on the sofa by itself. If the robot 20 does not have such a function, the user carries the robot 20 on the sofa and causes the robot 20 to sit next to the user. The robot 20 may participate in the game as a virtual player and for example, may virtually operate the opponent team of a baseball game being played by the user.

An information processing apparatus 10 receives operation information being input to an input apparatus 12 by the user, and performs an application such as a game. Note that the information processing apparatus 10 may reproduce content media such as a digital versatile disc (DVD), or may connect a network to reproduce streaming content from the content server. A camera 14 is a stereo camera, and photographs the user sitting in front of a display apparatus 11 which is a television at a predetermined cycle, and provides a photographed image to the information processing apparatus 10.

The object control system 1 controls an action of the robot 20 that is an actual object, by deducing the feeling from the reaction of the user. Basically, the action of the robot 20, which supports the game play of the user, is controlled so as to be pleased with the user for expressing sympathy for the user, and to provide the user with the joint viewing experience. Note that the object control system 1 of the embodiment manages the internal states of the robot 20 and the user. For example, if the robot 20's popularity rating for the user is low, the object control system 1 controls the action so as not to be pleased (no sympathy) together even when the user is pleased. Note that, in a case in which the robot 20 virtually participates in the game as an opponent player of the user, the action may be controlled so as to be sad conversely when the user is pleased. Basically, the robot 20 expresses feeling by contents of the speech indicating feeling, but may express feeling by moving its body.

Figure 3:
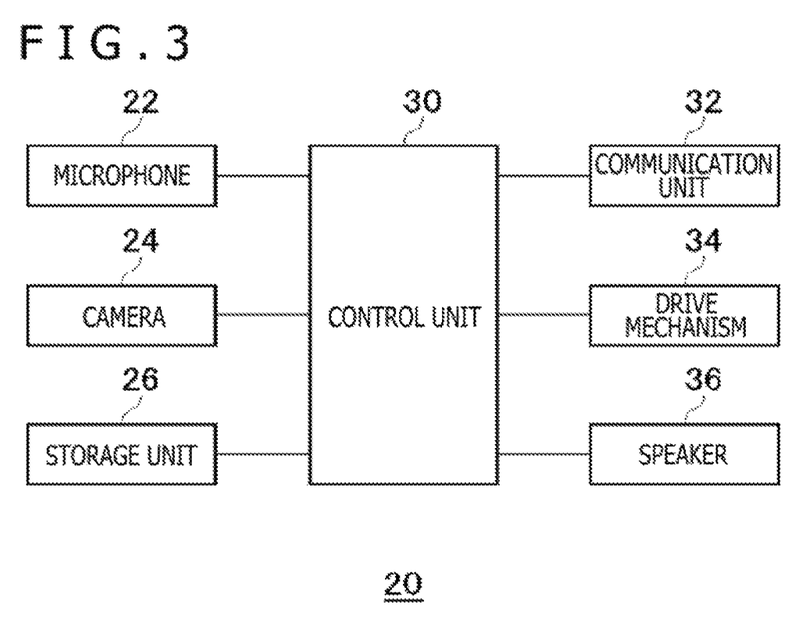
FIG. 3 illustrates a diagram of an input/output system of a robot.

FIG. 3 illustrates a diagram of an input/output system of the robot 20. A control unit 30 is a main processor that processes and outputs various data such as audio data and sensor data, and an instruction. A microphone 22 collects surrounding audio and converts it into an audio signal, and a camera 24 photographs the surrounding and acquires a photographed image. A storage unit 26 temporarily stores data and instructions processed by the control unit 30. A communication unit 32 transmits data being output from the control unit 30 to the external information processing apparatus 10 by wireless communication via an antenna. The communication unit 32 also receives the audio data and drive data from the information processing apparatus 10 by wireless communication via the antenna, and outputs the data to the control unit 30.

When receiving the audio data, the control unit 30 provides the audio to a speaker 36 and causes the speaker 36 to output the audio. When receiving the drive data, the control unit 30 causes a motor of a drive mechanism 34 to be rotated. The drive mechanism 34 includes the motor incorporated in the joint portion that is a movable part of the robot 20 and a link mechanism for connecting the motors. The arms, the leg, the neck, etc. of the robot 20 are moved by driving the motor.

Figure 4:
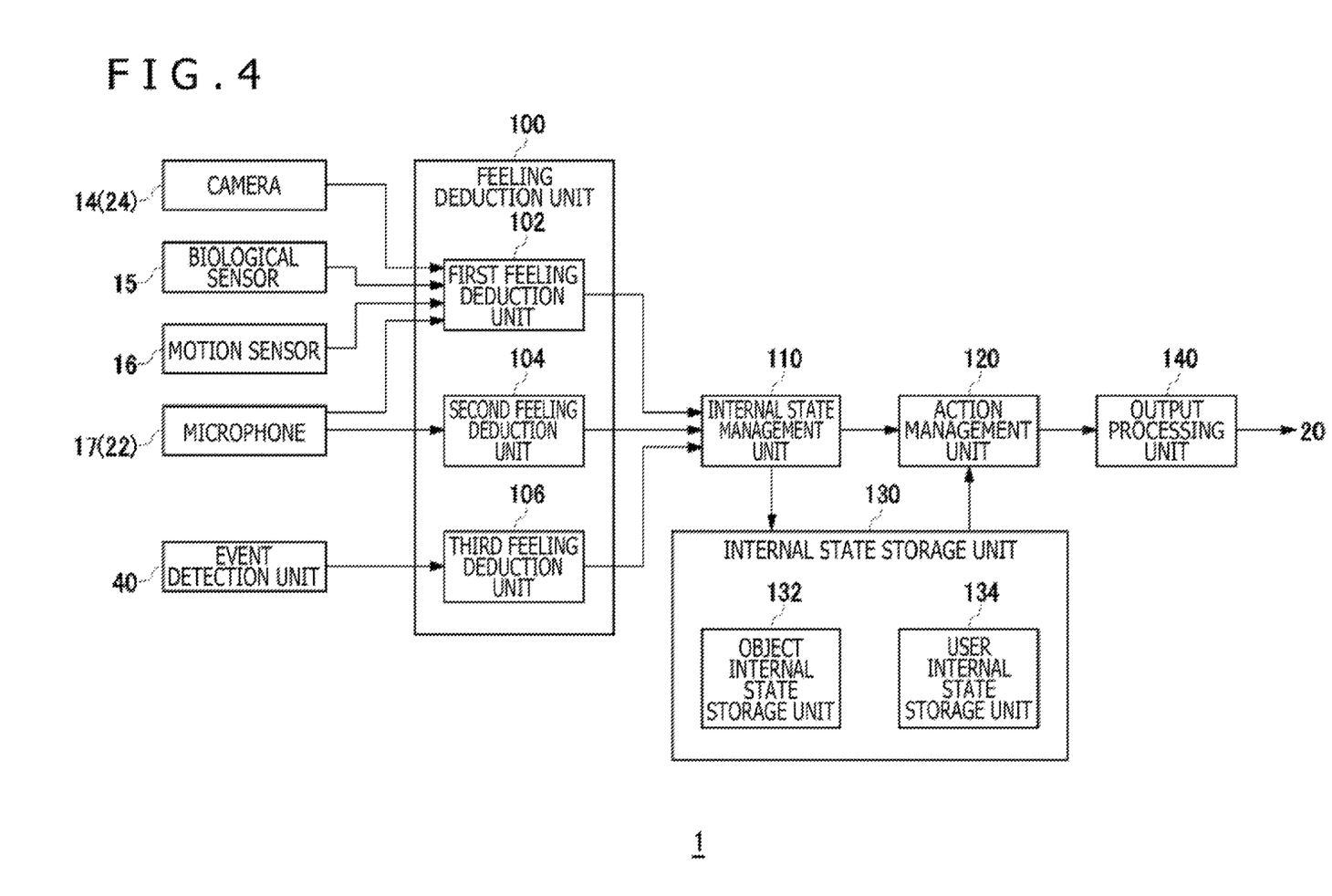
FIG. 4 illustrates a diagram of a configuration of the object control system that controls an object.

FIG. 4 illustrates a diagram of a configuration of the object control system that controls the object. The object control system 1 includes a feeling deduction unit 100, an internal state management unit 110, an action management unit 120, an internal state storage unit 130, and an output processing unit 140. The internal state storage unit 130 has an object internal state storage unit 132 and a user internal state storage unit 134. The feeling deduction unit 100 includes a first feeling deduction unit 102, a second feeling deduction unit 104, and a third feeling deduction unit 106, and performs a process of deducing feelings with these three systems.

The object control system 1 also includes the camera 14 for photographing the user, a biological sensor 15 for detecting biological information of the user, a motion sensor 16 for detecting a motion of the user, a microphone 17 for acquiring audio signals around the user, and an event detection unit 40 for detecting occurrence of an event.

In FIG. 4, each element, being described as a functional block that performs various processing, may include, a circuit block, a memory, other large-scale integrated circuits (LSIs) in terms of hardware, and may be achieved by a program loaded into the memory, etc., in terms of software. Therefore, it is understood by the person skilled in the art that these functional blocks may be achieved in various forms by only hardware, only software, or a combination thereof, and is not limited to any of them.

In FIG. 4, each configuration of the feeling deduction unit 100, the internal stare management unit 110, the action management unit 120, the internal state storage unit 130, and the output processing unit 140 is provided in the information processing apparatus 10, and the Information processing apparatus 10 may control the action of the robot 20. Further, each configuration of the feeling deduction unit 100, the internal state management unit 110, the action management unit 120, the internal state storage unit 130, and the output processing unit 140 is provided in the robot 20, and the robot 20 may control its own action autonomously. In this case, the robot 20 includes an autonomous robot and may act alone. In addition, a part of the feeling deduction unit 100, the internal state management unit 110, the action management unit 120, the internal state storage unit 130, and the output processing unit 140 may be provided in the information processing apparatus 10, and the rest may be provided in the robot 20. In this case, the information processing apparatus 10 and the robot 20 cooperate with each other and operate to control the action of the robot 20.

Thus, the object control system 1 illustrated in FIG. 4 may be achieved in various manners. In a case in which each of the above-described configurations is provided in the information processing apparatus 10, it is sufficient that the audio signal acquired by the microphone 22 of the robot 20 and the photographed image that is photographed by the camera 24 may be transmitted to the information processing apparatus 10 for use in processing in the information processing apparatus 10. Further, in a case in which each of the above-described configurations is provided in the robot 20, it is sufficient that the audio signal acquired by the microphone 17 connected to the information processing apparatus 10 and the photographed image that is photographed by the camera 14 may be transmitted to the robot 20 for use in processing in the robot 20. In addition, it is sufficient that the audio signal or the photographed image may be acquired by a microphone or a camera other than illustrated and may be provided to the information processing apparatus 10 or the robot 20. In the following, for convenience of explanation, as a representative, the camera 14 photographs the user, and the microphone 17 collects the user's utterance and converts it into the audio signal.

The feeling deduction unit 100 deduces the user's feeling on the basis of the outputs of various sensors and data from an external server. The feeling deduction unit 100 deduces the user's feeling by deriving an evaluation value for each of feeling indexes such as joy, anger, love, and surprise. In the embodiment, the user's feeling is expressed by a simple model, and the feeling deduction unit 100 deduces the user's feeling from three evaluation values: good feeling (positive feeling), bad feeling (negative feeling), and neither good nor bad feeling (neutral feeling). Note that in a practical use, each of "positive" and "negative" may be subdivided into a plurality of stages, allowing fine evaluation values to be derivable.

The first feeling deduction unit 102 deduces the user's feeling by performing nonverbal action understanding based on paralinguistic information or nonverbal information on the basis of outputs of various sensors, i.e., outputs of the camera 14 that is an image sensor, the biological sensor 15, the motion sensor 16, and the microphone 17. As compared with the second feeling deduction unit 104, the first feeling deduction unit 102 is characterized in that the user's feeling is deduced not being on the basis of the contents of the speech.

The first feeling deduction unit 102 extracts changes in facial expression, a gaze direction, a hand gesture, etc., of the user from the photographed image of the camera 14 and deduces the user's feeling. The biological sensor 15 is attached to the user and detects biological information such as a user's heart rate and user's sweating state. The first feeling deduction unit 102 derives the user's mental state from the biological information and deduces the user's feeling. The motion sensor 16 is attached to the user and detects the user's motion, and the first feeling deduction unit 102 deduces the user's feeling from the user's motion. Note that a role of the motion sensor 16 may also be substituted by analyzing the photographed image of the camera 14. Further, the first feeling deduction unit 102 deduces the user's feeling from the audio signal of the microphone 17 using a feature amount of the paralinguistic information. The paralinguistic information includes information such as speech speed, volume, voice inflection, intonation, wording, etc. The first feeling deduction unit 102 collects the user's feeling deduced from each of the outputs of the various sensors as one evaluation value for each evaluation index, and provides the evaluation value to the internal state management unit 110.

The second feeling deduction unit 104 deduces the user's feeling on the basis of the contents of the user's speech. More specifically, the second feeling deduction unit 104 performs natural language understanding for audio analysis of the contents of the user's speech from the output of the microphone 17, and then, deduces the user's feeling. Known algorithms may be used for natural language understanding techniques. If the user speaks that "I did it. I've got a home run" while playing the baseball game, the second feeling deduction unit 104 may deduce the feeling of the "joy" index of the user as "positive," whereas if the user speaks that "I have given up a home run," the second feeling deduction unit 104 may deduce the feeling of the "joy" index of the user as "negative." The second feeling deduction unit 104 provides the evaluation value of the deduced user's feeling to the internal state management unit 110.

The event detection unit 40 detects occurrence of the event in the object control system 1 and notifies the third feeling deduction unit 106 of contents of the occurred event. Regarding a game event, by performing the game program on an emulator, the emulator may detect an event such as a home run, so that the event detection unit 40 may be notified of the event from the emulator. Note that the event detection unit 40 may detect a home run event by referring to an access to performance data being reproduced at the time of a home run, or by the performance actually displayed on the display apparatus 11. The third feeling deduction unit 106 deduces the user's feeling from the notified event contents, and provides the evaluation value to the internal state management unit 110.

Note that the event detection unit 40 may be provided with an event occurrence timing from the external server that stores big data. For example, in a case in which the information processing apparatus 10 reproduces movie content, the event detection unit 40 acquires, in advance from the external server, a correspondence relationship table between time information of a scene of interest of the movie content and a deduced user's feeling in the scene of interest. The information processing apparatus 10 provides the correspondence relationship table to the third feeling deduction unit 106. When the time of the scene of interest arrives, the event detection unit 40 notifies the third feeling deduction unit 106 of the time information. The third feeling deduction unit 106 refers to the correspondence relationship table to acquire the user's feeling being associated with the time information, and deduces the user's feeling in the scene of interest. As described above, the third feeling deduction unit 106 may deduce the user's feeling on the basis of the information from the external server.

In the internal state storage unit 130, the object internal state storage unit 132 stores an internal state of the robot 20 that is an object, and the user internal state storage unit 134 stores an internal state of the user. The internal state of the robot 20 is defined at least by the feeling of the robot 20 and the robot 20's popularity rating for the user, and the internal state of the user is defined by the user's feeling and the user's popularity rating for the robot 20. The popularity rating is generated on the basis of evaluation values of a plurality of the latest feelings up to the present, and is evaluated by a long-term relationship between the user and the robot 20. The internal state of the robot 20 is derived from the speech and action of the user with respect to the robot 20.

The internal state management unit 110 manages the internal state of the robot 20 and the internal state of the user on the basis of the user's feeling deduced by the feeling deduction unit 100. Hereinafter, the internal state of the user will be described first, and then, the internal state of the robot 20 will be described. The "feeling" of the user is set by the feeling deduced by the feeling deduction unit 100. The internal state management unit 110 updates the evaluation value in the user internal state storage unit 134 on the basis of the feeling deduced by the feeling deduction unit 100.

When the evaluation value of "positive" is provided from the feeling deduction unit 100 for the feeling index of the user, the internal state management unit 110 updates the evaluation value of the feeling index to "positive," and when the evaluation value of "negative" is provided, the internal state management unit 110 updates the evaluation value of the feeling index to "negative." Here, "update" means a process of overwriting the original evaluation value in the internal state storage unit 130. Even in a case in which the original evaluation value is "positive" and the evaluation value to be overwritten is "positive," i.e., there is no change in the evaluation value, such case is called to "update" the evaluation value.

Note that the feeling deduction unit 100 deduces the user's feeling with the three systems including the first feeling deduction unit 102, the second feeling deduction unit 104, and the third feeling deduction unit 106, so that it may be possible that the evaluation values of the user's feeling deduced in each system contradict each other. Hereinafter, evaluation value update processing regarding the "joy" index when the user gets a home run in the baseball game will be described.

The third feeling deduction unit 106 holds an evaluation value table for deducing feeling as "positive" in a case in which the user gets a home run and as "negative" in a case in which the user gives up a home run. Upon receiving the event notification that the user has got a home run from the event detection unit 40, the third feeling deduction unit 106 deduces the evaluation value of the "joy" index as "positive" with reference to the evaluation value table.

Usually, when the user gets a home run, the user expresses feeling of the joy such as moving the body and chattering or saying, "I did it. I've got a home run." At this time, the first feeling deduction unit 102 and the second feeling deduction unit 104 both deduce the evaluation value of the "joy" index as "positive." Therefore, the evaluation values of the 'joy' index provided to the internal state management unit 110 from the feeling deduction unit 100 via the three systems are all "positive," and the internal state management unit 110 updates the evaluation value of the "joy" index in the user internal state storage unit 134 to "positive."

However, in a case in which the user is aiming for anything other than a home run, the user may not always express the speech and action of joy. For example, when the user is aiming for a triple hit in order to establish a cycle hit (one batter will get an one-base hit, a two-base hit, a three-base hit, and a home run in one game), the user may not be pleased even if the user get a home run. In the game, besides winning and losing, there are also provided rules for commending a special play such as a cycle hit, in many cases. Accordingly, a user who is aiming for awards may be happier with a three-base hit than a home run. Thus, when the user who got a home run speaks "Oops. I've got a home run" dispiritedly, the first feeling deduction unit 102 and the second feeling deduction unit 104 both deduce the evaluation value of the "joy" index as "negative."

Therefore, the internal state management unit 110 is provided with the "negative" evaluation value from the first feeling deduction unit 102 and the second feeling deduction unit 104, and the "positive" evaluation value from the third feeling deduction unit 106. The internal state management unit 110 may adopt an evaluation value that matches with half or more of the evaluation values being provided from the three systems. That is, the internal state management unit 110 may adopt an evaluation value that matches with half or more of the evaluation values being independently provided from a plurality of systems, according to a majority rule. Therefore, in this case, the evaluation value of the "joy" index may be updated to "negative."

Note that the internal state management unit 110 may set priorities to the evaluation values provided from the three systems, and may determine the evaluation value to be adopted according to the priorities. The ranking of each evaluation value will be described below. First, the evaluation value deduced by the third feeling deduction unit 106 is a unique evaluation value defined for the event, and does not reflect the actual state of the user. Therefore, the evaluation value deduced by the third feeling deduction unit 106 may be set to the lowest priority to be adopted.

Next, when the first feeling deduction unit 102 and the second feeling deduction unit 104 are compared, the second feeling deduction unit 104 deduces feeling on the basis of only the contents of the user's speech, and there is an aspect that an amount of information for the deduction is small. In addition, even if the contents of the speech themselves are positive contents, the user may speak self-abusively, in some cases. For example, there are some cases where although the user was aiming for a three-base hit, the user speaks "I've got a home run" dropping the user's shoulder dispiritedly. In this case, the second feeling deduction unit 104 deduces the "positive" evaluation value, but the first feeling deduction unit 102 deduces the "negative" evaluation value from the user's attitude or the paralinguistic information. As described above, since the user may speak a word contrary to emotion, the internal state management unit 110 may set reliability of the evaluation value by the first feeling deduction unit 102 higher than reliability of the evaluation value by the second feeling deduction unit 104. Therefore, the internal state management unit 110 may set the priority in the order of the evaluation values according to the first feeling deduction unit 102, the second feeling deduction unit 104, and the third feeling deduction unit 106.

The internal state management unit 110 may update the internal state of the user by setting the priority if the evaluation value may be obtained by at least one system. In a case in which the user's feeling deduced by the first feeling deduction unit 102 does not match with the user's feeling deduced by the second feeling deduction unit 104, the internal state management unit 110 updates the internal state of the user on the basis of the user's feeling deduced by the first feeling deduction unit 102 according to the priority. Also, for example, when the user gets a home run, in a case in which the first feeling deduction unit 102 and the second feeling deduction unit 104 may not deduce the positive or negative user's feeling (in a case in which the user neither moves nor speaks at all), it is sufficient that the internal state management unit 110 adopts the evaluation value deduced by the third feeling deduction unit 106.

The user's "popularity rating" for the robot 20 is derived from a plurality of the evaluation values of the feeling deduced from the speech and action performed by the user on the robot 20 up until the present time. A name of the robot 20 is assumed to be "Hikoemon" in the following description. When the robot 20 speaks to the user, if the user responds as "Hikoemon, that's exactly what you say," the feeling deduction unit 100 deduces that the evaluation value of the user's "love" index is "positive," whereas if the user responds as "Hikoemon, you're noisy, be quiet," the feeling deduction unit 100 deduces that the evaluation value of the user's "love" index is "negative." Also, when the robot 20 speaks to the user as "Please charge me soon," if the user charges the robot 20 immediately, the feeling deduction unit 100 deduces that the evaluation value of the user's "love" index to "positive," whereas if the user does not charge immediately, the feeling deduction unit 100 deduces that the evaluation value of the user's "love" index to "negative." Furthermore, if the user strokes the head of the robot 20, the feeling deduction unit 100 deduces that the evaluation value of the user's "love" index is "positive," whereas if the user kicks the robot 20, the feeling deduction unit 100 deduces that the evaluation value of the user's "love" index to "negative."

When receiving the evaluation value of the user's "love" index from the feeling deduction unit 100, the internal state management unit 110 reflects the evaluation value on the user's popularity rating. The internal state management unit 110 stocks the plurality of the evaluation values of the "love" index up until the present time, and deduces, for example, the user's popularity rating for the robot 20 on the basis of the plurality of the latest evaluation values (e.g., 21 evaluation values). Here, among the plurality of the evaluation values excluding the neutral evaluation value, the evaluation value having the larger number of the positive evaluation value and the negative evaluation value may be set as the evaluation value of the popularity rating. That is, if there are 11 or more positive evaluation values among the latest 21 evaluation values, the evaluation value of the popularity rating may be set as "positive," whereas if there are 11 or more negative evaluation values, the evaluation value of the popularity rating may be set as "negative."

The above is the description of the internal state of the user, and then the internal state of the robot 20 will be described.

The robot 20's "popularity rating" for the user is derived from the plurality of the evaluation values of the feeling deduced from the speech and action performed by the user on the robot 20 up until the present time. The internal state management unit 110 receives the evaluation value of the "love" index from the feeling deduction unit 100, and reflects the evaluation value on the robot 20's popularity rating for the user. The robot 20's popularity rating for the user tends to be linked to the user's popularity rating for the robot 20 described above. The internal state management unit 110 stocks the plurality of the evaluation values of the "love" index up to the present time, and determines the robot 20's popularity rating for the user on the basis of, for example, the plurality of the latest evaluation values (e.g., 11 evaluation values). Here, the reason for reducing the number of the evaluation values to be referred to when deducing the user's popularity rating is to make it easy to change the robot 20's popularity rating for the user. The robot 20's popularity rating for the user is an important parameter in determining the robot 20's feeling. Note that the popularity rating for the user may be evaluated not only by "positive" and "negative" but also by each of "positive" and "negative" in the plurality of stages.

In the embodiment, if the robot 20's popularity rating for the user is positive, the robot 20 empathizes with the user and performs action to achieve the joint viewing experience, while if the popularity rating for the user is negative, the robot 20 does not empathize with the user, but rather performs the action to react against the user. The action management unit 120 determines the action including the audio output of the robot 20 on the basis of the internal state of the robot 20 and the internal state of the user.

The action of the robot 20 when the user gets a home run in the baseball game will be described. The feeling deduction unit 100 deduces that the evaluation value of the "joy" index is "positive," and the internal state management unit 110 updates the evaluation value of the "joy" index of the user to "positive." Further, the internal state management unit 110 determines the evaluation value of the "joy" index of the robot 20 with reference to the evaluation value of the "joy" index of the user and the evaluation value of the robot 20's popularity rating for the user.

<In a Case in Which the Popularity Rating for the User is Positive>

In the case that the robot 20's popularity rating for the user is set to be positive, the internal state management unit 110 manages the robot 20's feeling so as to empathize with the user's feeling. Therefore, if the evaluation value of the "joy" index of the user is updated to be positive, the internal state management unit 110 also updates the evaluation value of the "joy" index of the robot 20 to be positive. Upon updating the internal state of the robot 20, the internal state management unit 110 provides the action management unit 120 with trigger information indicating that it is time to determine the action of the robot 20. Upon receiving the trigger information, the action management unit 120 determines the action of the robot 20 including the audio output on the basis of the internal state of the robot 20 updated in the object internal state storage unit 132, specifically, on the basis of the evaluation value of the updated feeling. For example, the action management unit 120 generates the contents of the speech "o×(player's name) is awesome. He has got a home run," and determines the action as the movement of the robot 20 with arms up in the air twice. These contents of the speech and the movements are notified to the output processing unit 140, and the output processing unit 140 causes the robot 20 to perform the action determined by the action management unit 120.

The output processing unit 140 generates the audio data for controlling the output timing of the robot 20 such as a speech speed and each timing of the speech and the movement, etc., and the drive data for driving the robot 20, to output the data to the robot 20. When the communication unit 32 in the robot 20 receives the audio data and the drive data, the control unit 30 provides the audio data to the speaker 36 so as to cause the speaker 36 to output the audio, and cause the motor of the drive mechanism 34 to be driven on the basis of the drive data. Accordingly, the robot 20 performs the speech and the movement that empathizes with the user who has got a home run. The user sees the robot 20 being pleased together, and the affinity with the robot 20 as well as the motivation for the game may be increased.

Conversely, in a case in which the user gives up a home run, the evaluation value of the "joy" index of the user is updated to negative, so that the internal state management unit 110 updates the evaluation value of the "joy" index of the robot 20 to negative. Upon updating the internal state of the robot 20, the internal state management unit 110 provides the action management unit 120 with the trigger information. Thereby, the action management unit 120 determines the action including the audio output of the robot 20 on the basis of the evaluation value of the "joy" index of the robot 20 updated in the object internal state storage unit 132. For example, the action management unit 120 generates the contents of the speech "Oh no. You've given up a home run," and determines, as the movement of the robot 20, the action that causes weakness in a dejected manner. These contents of the speech and movements are notified to the output processing unit 140, and the output processing unit 140 causes the robot 20 to perform the action determined by the action management unit 120.

<In a Case in Which the Popularity Rating for the User is Negative>

In contrast, in a case in which the robot 20's popularity rating for the user is set to be negative, the internal state management unit 110 manages the robot 20's feeling so as not to empathize with the user's feeling. The internal state management unit 110 rather manages the robot 20's feeling so as to react against the user, thereby allowing the user to realize that the user should treat the robot 20 more carefully.

Therefore, even if the evaluation value of the "joy" index of the user who has got a home run is updated to positive, the internal state management unit 110 updates the evaluation value of the "joy" index of the robot 20 to negative. If the robot 20's popularity rating for the user is negative, the internal state management unit 110 updates the evaluation value of the robot 20's feeling to a value opposite to the evaluation value of the user's feeling. Therefore, if the feeling evaluation value of the user is positive, the feeling evaluation value of the robot 20 may updated negative. If the feeling evaluation value of the user is negative, the feeling evaluation value of the robot 20 may be updated positive.

Upon updating the internal state of the robot 20, the internal state management unit 110 provides the action management unit 120 with trigger information indicating that it is time to determine the action of the robot 20. Accordingly, the action management unit 120 determines the action including the audio output of the robot 20 on the basis of the internal state of the robot 20 updated in the object internal state storage unit 132, specifically, the negative evaluation value of the "joy" index. For example, the action management unit 120 may not generate the contents of the speech (i.e., ignore the user), and may determine the action as the movement of the robot 20 to turn in the opposite direction to the user (turn to the other side). These contents of the action are notified to the output processing unit 140, and the output processing unit 140 causes the robot 20 to perform the action determined by the action management unit 120.

Seeing this action of the robot 20, the user notices that the robot 20 is not pleased with the user this time, although the robot 20 was pleased together before. The user looks back at the user's own attitude and recognises that the robot 20 is not pleased together with the user because of the user's cold contact with the robot 20. By causing the robot 20 to react against the user by dare, an opportunity for the user to keep in mind to gently treat the robot 20 from now on is given to the user.

Thus, in the object control system 1, the relationship between the user and the robot 20 is managed in the same manner as the human relationship in an actual human society. In the communication between people in real world, a good relationship is generated by coming in contact with each other with consideration for each other. If one is not considerate, the other will not be able to be considerate. In the object control system 1, this considerateness is expressed by the feeling of the "love" index, and the human relationship through the considerateness is expressed by the "popularity rating" index. Therefore, the evaluation value of the user's popularity rating in the object control system 1 and the evaluation value of the robot 20's popularity rating also tend to be linked. In a case in which the robot 20's popularity rating for the user is lowered, the evaluation value for the popularity rating for the user is improved from negative to positive by the user coming in contact with the robot 20 with more consideration, and then, the user may get again the joint viewing experience together with the robot 20.

The robot 20 may be a kind of a friend by increasing the user's affinity with the robot 20. If the user is living an irregular life, the robot 20 may propose improvement of the life rhythm, for example, saying "Let's go to bed soon" and such a case that the user listens to and accepts the robot 20 as advice from a friend may be also considered in the future. In order to achieve such case described above, constructing a mechanism to increase the user's affinity with the robot 20 through the joint viewing experience with the robot 20 also leads to expanding the future possibilities of the robot 20.

Note that, in the above-described embodiment, although the mechanism is proposed in which the user obtains the joint viewing experience with the robot 20 being an actual object, a mechanism for obtaining the joint viewing experience between the virtual objects may be similarly constructed.

In this case, the virtual object may be a character such as a person or a pet including the 3D model, and exists in the virtual space generated by the computer. In the embodiment, in the virtual space constructed when the user wears the HMD, the mechanism is proposed in which the contents are reproduced in front of the user, and when the user turns sideways, the user may see how the virtual character is viewing the content together with the user. Similarly to the robot 20, the virtual character also communicates with the user by outputting the reaction to empathize with the user or outputting the reaction against the user conversely.

Figure 5:
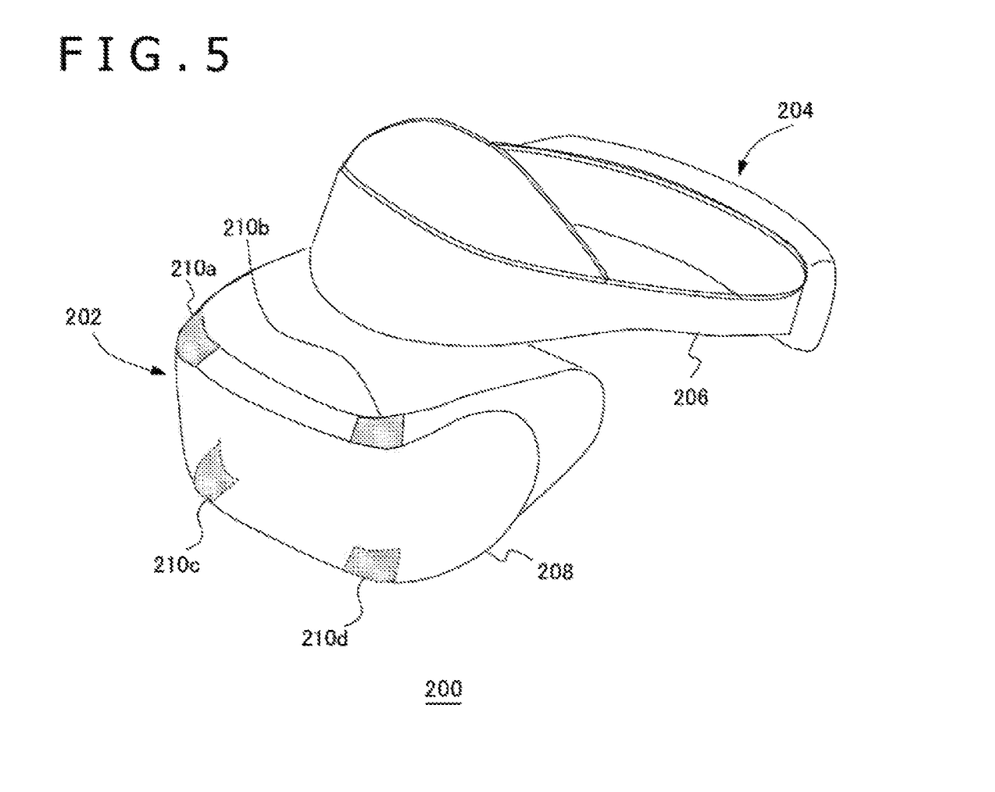
FIG. 5 illustrates a diagram at an example of an appearance form of a head mounted display (HMD).

FIG. 5 illustrates a diagram of an example of the appearance form of the HMD 200. The HMD 200 includes an output mechanism unit 202 and a mounting mechanism unit 204. The mounting mechanism unit 204 includes a mounting band 206 for fixing the HMD 200 to the head by circling the head with being worn by the user.

The output mechanism unit 202 includes a housing 208 shaped to cover the left and right eyes in a state where the user wears the HMD 200, and internally includes a display panel which is located opposed to the eyes at the time of wearing. The display panel may be a liquid crystal panel or an organic electroluminescence (EL) panel. The housing 208 further includes a pair of left and right optical lenses located between the display panel and the user's eyes and enlarging a viewing angle of the user. The HMD 200 may further include a speaker or an earphone at a position corresponding to the user's ear and may be configured to be connected with an external headphone. In addition, a camera that photographs the face of the user is provided inside the housing 208 and is used to detect a facial expression of the user.

On an outer surface of the housing 208, light emission markers 210a, 210b, 210c, and 210d are provided, which are tracking light emitting diodes (LEDs). The light emission marker 210 is photographed by the camera 14, and the information processing apparatus 10 analyzes a position of each marker. Further, a posture sensor (acceleration sensor and gyro sensor) is mounted on the HMD 200. The HMD 200 is connected to the information processing apparatus 10 by a known wireless communication protocol, and transmits the sensor data detected by the posture sensor to the information processing apparatus 10. The information processing apparatus 10 identifies a direction in which the HMD 200 faces on the basis of the photographed position of the light emission marker 210 and the sensor data of the posture sensor.

Here, the information processing apparatus 10 transmits content data such as a movie to the HMD 200. The information processing apparatus 10 sets a reference direction in which the HMD 200 faces, and installs a virtual display in the reference direction, and then, displays reproducing data of content on the virtual display. Further, the information processing apparatus 10 arranges the virtual object facing the virtual display at a position rotated by 90 degrees with respect to the reference direction, for example, around the viewpoint position. Accordingly, when the user rotates the gaze direction sideways by 90 degrees, the user may see the virtual object viewing content together next to the user.

In this way, the user wearing the HMD 200 may obtain the joint viewing experience with the virtual object. The virtual object action determination process is as described for the robot 20. In addition, since the degree of freedom of action of the virtual object is higher than that for the robot 20, the various positive or negative feeling may be caused to be expressed.

As described above, according to the embodiment, the user may increase the affinity with the actual object or the virtual object through the joint viewing experience, thereby the user's life may be further enriched.

The present invention has been described above on the basis of the embodiments. The embodiment is an exemplification, and it is understood by the person skilled in the art that various modifications may be made to the combinations of the respective constituent elements and the respective processing processes and such modifications are also within the scope of the present invention.

In the embodiment, the action management unit 120 generates the contents of the speech, "o×(player's name) is awesome. He has got a home run" as an empathic expression when the user gets a home run. In the modified example, in order to emphasize the joint viewing experience, the action management unit 120 may actively cause the object to output the audio in which a subject is replaced by a demonstrative pronoun. Specifically, the expression of "o×(player's name)" may be replaced with "He," which is the demonstrative pronoun, to generate the contents of the speech such as "He is awesome. He has got a home run." By using the demonstrative pronoun, the user may further increase a sense of viewing together with the robot 20.

REFERENCE SIGNS LIST

1 . . . Object control system, 10 . . . Information processing apparatus, 20 . . . Robot, 40 . . . Event detection unit, 100 . . . Feeling deduction unit, 102 . . . First feeling deduction unit, 104 . . . Second feeling deduction unit, 106 . . . Third feeling deduction unit, 110 . . . Internal state management unit, 120 . . . Action management unit, 130 . . . Internal state storage unit, 132 . . . Object internal state storage unit, 134 . . . User internal state storage unit, 140 . . . Output processing unit.

INDUSTRIAL APPLICABILITY

The present invention may be used in the technical field in which an action of an object is controlled.

The invention claimed is:

1. An object control system controlling an object, the object control system comprising:
   a feeling deduction unit configured to deduce a user's feeling;
   a user internal state storage unit configured to store an internal state of the user including the user's feeling;
   an object internal state storage unit configured to store an internal state of the object including an object's feeling;
   an internal state management unit configured to manage the internal state of the object and the internal state of the user on a basis of the deduced user's feeling;
   an action management unit configured to determine an action of the object on a basis of the internal state of the object; and
   an output processing unit configured to cause the object to perform the action determined by the action management unit,
   wherein the internal state of the object includes an object's popularity rating for the user being derived from a plurality of evaluation values of a feeling that is deduced up until the present time, and
   wherein the action of the object is selected to be in alignment with the user's feeling if the popularity rating is greater than a predetermined threshold, and
   wherein the action of the object is selected to be in opposition to the user's feeling if the popularity rating is less than the predetermined threshold.

2. The object control system according to claim 1, wherein
   the feeling deduction unit includes:
   a first feeling deduction unit configured to deduce the user's feeling on a basis of sensor output; and
   a second feeling deduction unit configured to deduce the user's feeling on a basis of contents of a user's speech, and
   the internal state management unit updates the internal state of the object and/or the internal state of the user on a basis of output of the first feeling deduction unit and/or the second feeling deduction unit.

3. The object control system according to claim 2, wherein
   in a case in which the user's feeling deduced by the first feeling deduction unit does not match with the user's feeling deduced by the second feeling deduction unit, the internal state management unit updates the internal state of the user on a basis of the user's feeling deduced by the first feeling deduction unit.

4. The object control system according to claim 1, wherein the object includes an actual object or a virtual object.

5. The object control system according to claim 1, wherein
   the action management unit causes the object to output audio in which a subject is replaced by a demonstrative pronoun.

6. An object control method comprising:
   deducing a user's feeling;
   storing an internal state of the user including the user's feeling;
   storing an internal state of an object including an object's feeling;
   managing the internal state of the object and the internal state of the user on a basis of the deduced user's feeling;
   determining an object's popularity rating for the user being derived from a plurality of evaluation values of a feeling that is deduced up until the present time;
   determining an action of the object on a basis of the internal state of the object; and
   causing the object to perform the determined action,
   wherein the action of the object is selected to be in alignment with the user's feeling if the popularity rating is greater than a predetermined threshold, and
   wherein the action of the object is selected to be in opposition to the user's feeling if the popularity rating is less than the predetermined threshold.

7. A non-transitory computer readable medium having stored thereon a program for a computer, comprising:
   by a feeling deduction unit, deducing a user's feeling;
   by a user internal state storage unit, storing an internal state of the user including the user's feeling;
   by an object internal state storage unit, storing an internal state of an object including an object's feeling;
   by an internal state management unit, managing the internal state of the object and the internal state of the user on a basis of the deduced user's feeling;
   by an action management unit, determining an action of the object on a basis of the internal state of the object; and
   by an output processing unit, causing the object to perform the determined action,
   wherein the internal state of the object includes an object's popularity rating for the user being derived from a plurality of evaluation values of a feeling that is deduced up until the present time, and
   wherein the action of the object is selected to be in alignment with the user's feeling if the popularity rating is greater than a predetermined threshold, and
   wherein the action of the object is selected to be in opposition to the user's feeling if the popularity rating is less than the predetermined threshold.

* * * * *